April 17, 1934.  P. J. FITZGERALD  1,955,279
POWER ADAPTER
Filed Dec. 6, 1932  3 Sheets-Sheet 1

WITNESS:

INVENTOR
Patrick J. Fitzgerald
BY Joshua R.H. Potts
HIS ATTORNEY

April 17, 1934.  P. J. FITZGERALD  1,955,279
POWER ADAPTER
Filed Dec. 6, 1932  3 Sheets-Sheet 2
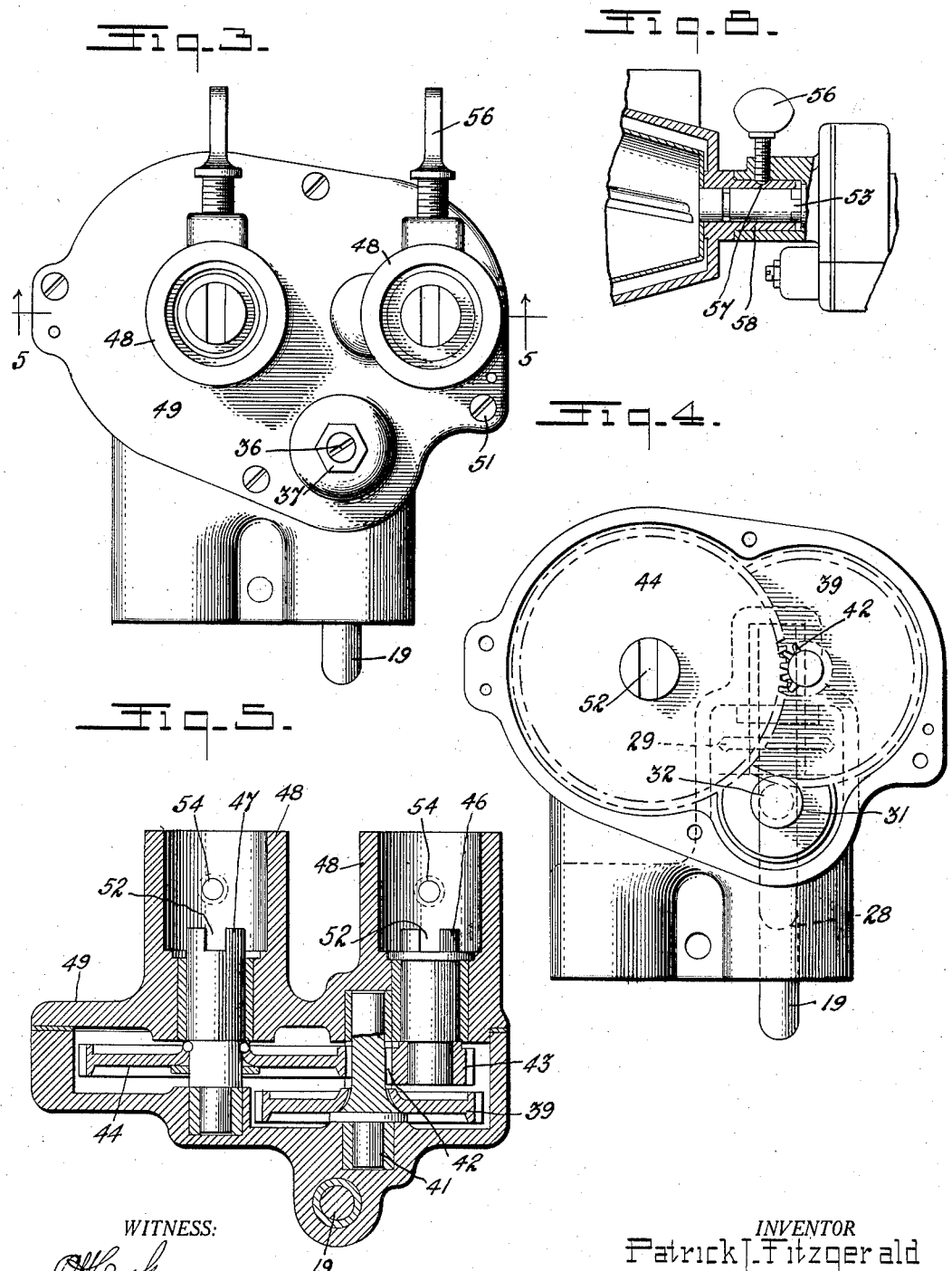

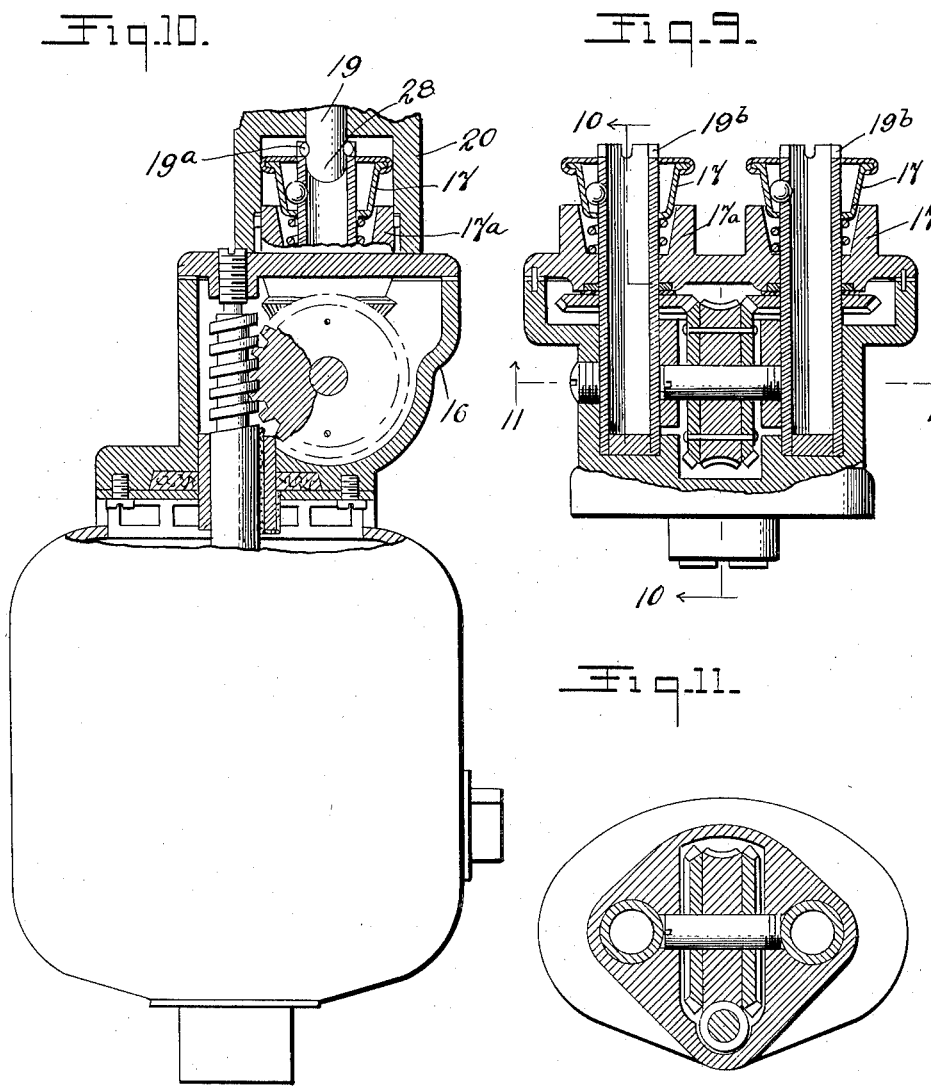

Patented Apr. 17, 1934

1,955,279

UNITED STATES PATENT OFFICE 1,955,279

POWER ADAPTER

Patrick J. Fitzgerald, Torrington, Conn., assignor to The Fitzgerald Mfg. Company, Torrington, Conn., a corporation of Connecticut Application December 6, 1932, Serial No. 645,928

6 Claims. (Cl. 74—389)

This invention relates to a power adapter and particularly to a power adapter designed to co-operate with an electrical utility device such as shown in my application for United States Letters Patent, filed April 12, 1932, Serial No. 604,844.

This application is also related to my Patent No. 1,898,945 application Serial No. 612,357, application Serial No. 645,929, and application Serial No. 663,268.

In application, 604,844 there is shown a motor whose shaft, operating through suitable gears, rotates a pair of power take-off members in opposite directions and at the same speed.

These take-off devices are utilized for driving certain mixing implements or beaters, juice extracting reamers, etc., but there are other devices particularly useful in the household, which might be applied to said electrical utility device were it not for the fact that the speed of said take-off members is entirely too high for use with accessories, such for instance as slicers, shredders, meat grinders, choppers, etc.

Efficiency also requires that the working implements in those accessories mentioned be driven at different speeds.

The object of the present invention, therefore, is to provide a power adapter for association with the electrical utility device of the application above mentioned, in order to provide means for securing an accessory thereto and for operating the working implements thereof at the proper speed or speeds.

According to the invention the adapter has means for fastening the same to the gear casing of the motor of said device, a stem meshing with one of the power take-off members thereof, a pair of power take-off devices, and gears between said stem and take-off devices for driving the same at different speeds.

Figure 1:
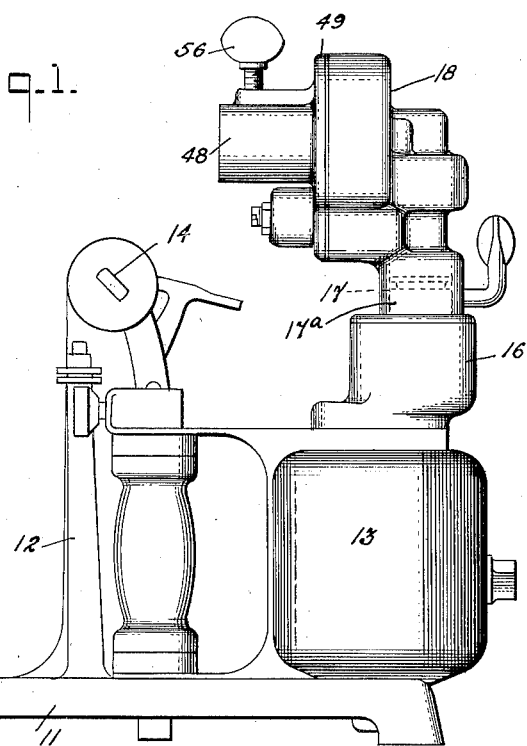
Figure 7:
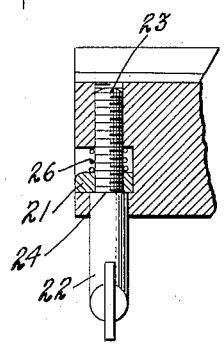
Figures 2, 6:
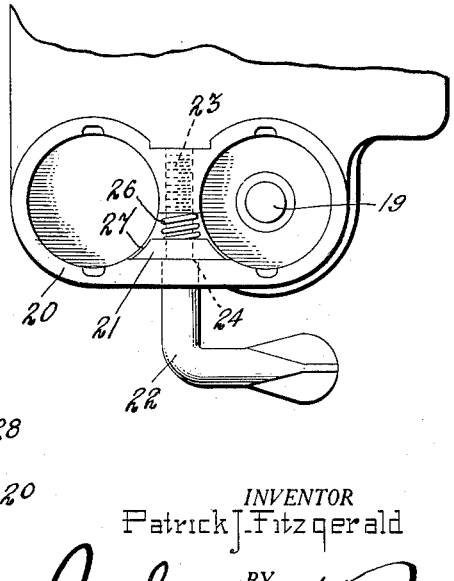

The drawings illustrate an embodiment of the invention and the views therein are as follows:

Figure 1 is a side elevation of the electrical utility device showing the improved power adapter connected therewith, Figure 2 is a side elevation of the power adapter showing a part of the casing broken away to reveal the gear mechanism, Figure 3 is a front elevation of the power adapter, Figure 4 is a like view showing the cover removed and one of the take-off members and associated gear omitted, Figure 5 is a sectional view taken on the line 5—5 of Figure 3, Figure 6 is a fragmentary view looking into the end of the power take-off members, Figure 7 is a fragmentary detail sectional view through the clamping mechanism of Figure 6, Figure 8 is a fragmentary longitudinal sectional view through one of the power take-off members, and shows a portion of one of the accessories operatively connected thereto, Figure 9 is a vertical sectional view of the motor gear box, Figure 10 is a like view taken on the line 10—10 of Figure 9, and Figure 11 is a cross-sectional view taken on the line 11—11 of Figure 9.

As illustrated in the drawings, the electrical utility device has a base 11, an upright standard 12, and a motor 13 pivotally mounted on said standard at 14. The motor shaft extends into a gear casing 16 and drives a pair of take-off devices, one of which is indicated in Figure 1 by the numeral 17.

The power adapter, securely attached to the utility device, is also shown in Figure 1, and indicated by the numeral 18.

The motor gear casing has a pair of collars 17ª (see Figures 9 and 10) surrounding the take-off members, and Figure 6 illustrates a part of the adapter which fits over said collars, the stem 19 extending into one of the take-off members on said power unit while the adapter is clamped onto the collars of said gear casing by means of the locking plate 21, which is moved inwardly by means of the lever 22, that lever having a screw end 23 and a shoulder 24 against which the locking plate rests and against which it is urged by the spiral spring 26. The stem 19 has diametrically struck up lips 19ª which fit into slots 19ᵇ in the end of the take-off device to insure proper power transmission when the parts are arranged as described immediately above.

The arcuate faces 27 of this locking plate engage the outer faces of the collars, and thus bind the adapter firmly thereto.

The stem 19 is shown as extending below the part 20 which fits over the gear box collars, but this stem may be cut off and terminated, as shown by the dotted lines at 28.

This stem 19 has a bevel gear 29 which meshes with a bevel gear 31 on the stub shaft 32. This stub shaft has a reduced inner end 33 and at its other end is provided with a ball bearing 34 abutting a take-up screw 36 which is adjustably secured by means of the lock nut 37.

The shaft 32 has teeth 38 which mesh with a large gear 39 mounted on a stub shaft 41, and this shaft is provided with a toothed portion 42 (see Figure 5) which meshes with a pinion 43, and with a gear 44.

The pinion 43 is fixed to the inner end of the power take-off member 46, while the gear 44 is fixed to the power take-off member 47. It will, therefore, be self-evident that the speed of the members 46 and 47 is considerably different, and each of these members is provided with a collar 48 formed integral with the casing cover 49. The cover is held in place so as to enclose said gear mechanism by means of the machine screws 51.

The take-off members are each provided with a slot 52 at their ends to receive a transverse rib 53 of an accessory implement, as shown at Figure 8. Each of the collars 48 is provided with a threaded hole 54 for the reception of a winged screw 56 which is adapted to fit within an indentation 57 on the sleeve 58 of an accessory which fits into either of the collars 48. (See Figure 8).

The invention is hereby claimed as follows:

1. A power adapter comprising a casing, a shaft provided with coupling means, a bevel gear on said shaft, a stub shaft having a toothed section and a bevel gear for meshing with the first bevel gear, a second stub shaft having a toothed section and a gear meshing with the toothed section of the first stub shaft, and power take-off shafts having gears meshing with the toothed section of the second stub shaft for rotation at different speeds.

2. A power adapter comprising a casing, a shaft provided with coupling means, a bevel gear on said shaft, a stub shaft having a toothed section and a bevel gear for meshing with the first bevel gear, a second stub shaft having a toothed section and a gear meshing with the toothed section of the first stub shaft, power take-off shafts having gears meshing with the toothed section of the second stub shaft for rotation at different speeds, and means for operatively connecting an implement with either of said take-off shafts.

3. A power adapter comprising a casing, a shaft provided with coupling means, means to lock said adapter in operative position with a power unit, a bevel gear on said shaft, a stub shaft having a toothed section and a bevel gear for meshing with the first bevel gear, a second stub shaft having a toothed section and a gear meshing with the toothed section of the first stub shaft, and power take-off shafts having gears meshing with the toothed section of the second stub shaft for rotation at different speeds.

4. A power adapter comprising a casing, a shaft provided with coupling means, means to lock said adapter in operative position with a power unit, a bevel gear on said shaft, a stub shaft having a toothed section and a bevel gear for meshing with the first bevel gear, a second stub shaft having a toothed section and a gear meshing with the toothed section of the first stub shaft, power take-off shafts having gears meshing with the toothed section of the second stub shaft for rotation at different speeds, and means for operatively connecting an implement with either of said take-off shafts.

5. A power adapter comprising a casing provided with a pair of sleeve members having a locking plate extending between the same, means for moving said plate to lock said adapter in operative position with a power unit, a shaft provided with coupling means, a bevel gear on said shaft, a stub shaft having a toothed section and a bevel gear for meshing with the first bevel gear, a second stub shaft having a toothed section and a gear meshing with the toothed section of the first stub shaft, and power take-off shafts having gears meshing with the toothed section of the second stub shaft for rotation at different speeds.

6. A power adapter comprising a casing provided with a pair of sleeve members having a locking plate extending between the same, means for moving said plate to lock said adapter in operative position with a power unit, a shaft provided with coupling means, a bevel gear on said shaft, a stub shaft having a toothed section and a bevel gear for meshing with the first bevel gear, a second stub shaft having a toothed section and a gear meshing with the toothed section of the first stub shaft, power take-off shafts having gears meshing with the toothed section of the second stub shaft for rotation at different speeds, and means for operatively connecting an implement with either of said take-off shafts.

PATRICK J. FITZGERALD.